UNITED STATES PATENT OFFICE.

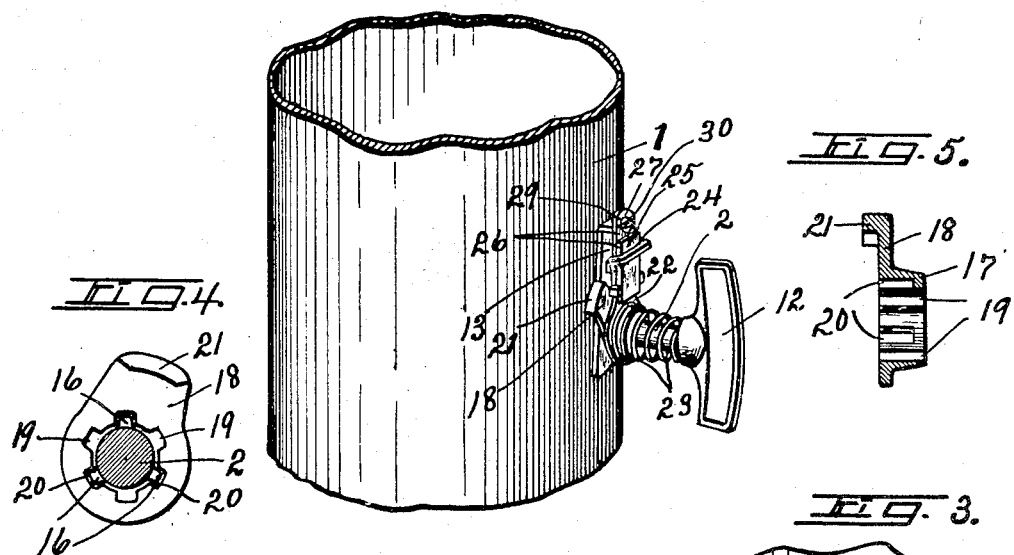

DAVID S. WATSON, OF CANASTOTA, NEW YORK.

HEAT-CONTROLLED DAMPER FOR HEATER-PIPES.

1,125,416.  Specification of Letters Patent.  Patented Jan. 19, 1915.

Application filed June 10, 1914. Serial No. 844,144.

*To all whom it may concern:*

Be it known that I, DAVID S. WATSON, of Canastota, in the county of Madison, in the State of New York, have invented new and useful Improvements in Heat-Controlled Dampers for Heater-Pipes, of which the following, taken in connection with the accompanying drawings, is a full, clear, and exact description.

This invention relates to certain improvements in heat-controlled dampers for heater pipes of the class set forth in my pending application No. 772,753 filed June 10, 1913, and No. 811,719, filed January 12, 1914, except that the main object of the present device is to allow the damper to be turned by hand to any angle and frictionally held in such position while the fusible detent is intact and to relieve the damper from such friction immediately upon the disintegration of the detent by heat so as to allow the damper to close quickly and automatically.

Another object is to provide means for limiting the opening and closing movement of the damper.

A further object is to permit the detent to be easily and quickly removed or replaced without disturbing any of the other parts of the damper-turning mechanism.

A still further object is to place the sectional detent under spring tension so that when the fusible connection between the sections is destroyed, the spring tension will assist in separating such sections to free the damper and allow it to close automatically.

Another object is to lock the stop washer to the damper-operating rod to turn therewith and at the same time to permit it to be removed from the rod when desired.

A further object is to mount the detent-supporting arm on the hub of the stop washer so that it may be spring-pressed against said washer to frictionally hold the damper in its adjusted position when the detent is in use.

Other objects and uses relating to specific parts of the device will be brought out in the following description.

In the drawings Figure 1 is a perspective view of a portion of the pipe section showing my improved damper-operating mechanism thereon. Figs. 2 and 3 are sectional views of the same pipe section taken at right angles to each other, the damper being in its full open position, while the dotted lines in Fig. 3 show its closed position. Figs. 4 and 5 are respectively a face view and a sectional view of the stop washer, the damper-operating rod being shown in Fig. 4. Figs. 6, 7, 8 and 9 are perspective views respectively of the detached anchor plate for the detent, the stop washer, the supporting arm for the detent and the detent. Fig. 10 is a perspective view of a modified form of stop plate or anchor for the detent in which the hub is square and fitted in a square hole in the pipe section, thereby obviating the necessity for extra rivets or other fastening means. Fig. 11 is a detail sectional view taken on line 11—11, Fig. 10.

In order that my invention may be clearly understood, I have shown a portion of a pipe section —1— which may be a smoke pipe for conducting the products of combustion from a heater or any other heat-distributing pipe having diametrically opposite openings for receiving a damper-operating shaft or spindle —2— carrying a damper —3— which is weighted at one side at —4— to cause it to close automatically when released. This automatic closing of the damper is further facilitated by mounting it upon and wholly at one side of its operating shaft —2— and for this purpose is provided on one side with apertured lugs —5— and —6— located diametrically opposite each other near the periphery of the damper which is also provided with an intermediate lug —7— having a V-shaped recess for receiving an angular portion —8— of the shaft, the aperture in the lug —6— being also angular for receiving a corresponding angular portion —9— on the same shaft, thereby positively locking the damper to its locking member to cause it to turn therewith and at the same time permitting the operating rod to be withdrawn from the apertures when necessary.

A portion —10— of the rod —2— between the angular portions —8— and —9— is preferably circular to form a shoulder abutting against one side of the lug —7— to limit the inward movement of the rod —2—, said rod being held against withdrawal by a staple —11— engaged with the opposite end of the annular shoulder —10— and secured in apertures in the damper —3—. The operating end of the rod —2— extends some distance to the outside of the pipe section through the opening in the adjacent side thereof and is provided with a staple handle —12— by which it may be turned. An anchor plate —13— is secured by a rivet —14— to the outer face of the pipe section —1— nearest the operating handle —2— so as to surround the adjacent portion of the rod —2— and is provided with a hub extending through the opening in the pipe section for additionally holding it against turning, said hub being provided with a brass or equivalent bushing —15— in which the adjacent portion of the damper-operating rod is journaled.

The portion of the rod —2— just at the outer end of the bushing —15— is preferably cylindrical and provided with a series of, in this instance three, radial lugs —16— for interlocking engagement with the hub —17— of a stop plate —18—, said hub being provided with internal axially extending grooves —19— and —20— arranged in sets of, in this instance three, each spaced equi-distant apart to correspond with the spacing of the rods or lugs —16—, those of one set being extended from end to end of the hub to register with the lugs —16— and allow the stop plate to be withdrawn from the operating rod when the latter is removed from the damper, while the other set of grooves terminate short of the outer end of the hub to form shoulders which engage the outer ends of the lugs or ribs —16— when the parts are assembled for use to hold said stop plate from frictional engagement with the adjacent outer end of the bushing —15— or adjacent portions of the pipe section and at the same time locking the stop plate to the damper-operating rod to rotate therewith. This stop plate is provided with an inwardly projecting flange —21— to engage one edge of the anchor plate —13— at opposite sides of the axis of the damper-operating rod to limit the opening movement and also the closing movement of the damper to the positions shown by full lines and dotted lines in Fig. 3.

Journaled on the hub of the stop plate —18— is a revoluble arm —22— normally spring pressed against the outer face of the stop plate —18— by a coil spring —23—, the inner end of which surrounds the hub of the stop plate and bears against the outer face of the arm —22— while its outer end bears against the hub of the handle —12—, thereby producing sufficient friction between the stop plate and arm to hold the damper at any angle of adjustment, it being understood that the stop plate —18— is locked to the damper-operating member —2— and that the arm —22— is normally held against rotation by the detent presently described. The outer end of the arm —22— is offset laterally and provided with a slot —24— for receiving one of the members as —25— of a heat-destructible detent —26—, the other member, as —27—, of the detent being provided with an aperture —29— for receiving a lateral offset —30— on the outer end of the anchor plate —13— which, as previously stated, is rigidly secured to the pipe section —1—. The outer end of the offset —30— is reduced in width to just sufficient size to enter the aperture in the detent member —27— and forms a shoulder —31— against which the detent is spring-pressed by the spring —23—, thereby placing the member —27— under spring-tension so as to facilitate the separation of this member of the detent from its companion member —25— as soon as the fusible connection is destroyed by heat.

All of the features which I have described contribute to the carrying out of the several objects stated and particularly in facilitating the free adjustment of the damper by hand to any angle where it is held by friction produced by the spring —23— and at the same time assuring the automatic closing of the damper in case of overheating of the fusible connection between the detent members which would cause them to separate, the damper being self-closing by its own weight.

It will be observed that as long as the detent remains in operative position, the damper and its operating rod will be held in any position of adjustment by friction produced by the spring —23— in the manner described, but as soon as the detent is destroyed by overheating, the detent will be released from connection with the anchor plate —13—, thereby allowing the released detent member —25— to turn with the stop plate —18— which at that time will be free from frictional detention as will be clearly obvious from the foregoing description relating to the manner of mounting the stop plate upon the damper-operating member.

In Fig. 10, I have shown a modified form of anchor plate —13'— as provided with an angular hub —35— projecting into a corresponding opening in the adjacent side of the pipe and riveted thereto to firmly lock it to said pipe against relative turning movement, in which case the brass bushing —15— would be cylindrical to turn within the sides of the angular opening —35— or the adjacent portion of the operating rod —2— might turn freely in the bushing.

It will be evident from the foregoing description that in case the fusible detent is destroyed by heat, it may be easily and quickly replaced by a new one without in any way disturbing any of the other parts of the damper-operating mechanism by simply withdrawing the section plate —25— from the slot —24— and reinserting the corresponding plate of another detent and then interlocking its other plate —27— with the shoulder —30—.

What I claim is:

1. In combination with a self-closing damper, heat-controlled means normally holding the damper open and including a friction device for holding the damper at any angle of adjustment, such friction being reduced by the operation of said means by heat.

2. In combination with a self-closing damper, turning means therefor, friction members spring pressed into frictional contact for holding the turning means and damper in any position of adjustment, one of said members being locked to the turning means, and heat-controlled means holding the other member against turning with the first named member.

3. In combination with a self-closing damper, an operating rod for turning the damper, a friction plate locked to the rod to turn therewith, a holding plate spring pressed into frictional contact with said friction plate and adapted to turn therewith when released, and heat controlled means for holding the first named plate against turning.

4. In combination with a self-closing damper, and heat-controlled means normally holding the damper open, said means including a friction device for permitting the damper to be adjusted to different positions without releasing it.

5. In combination with a self-closing damper, and means normally holding the damper open and comprising a sectional detent having its sections fastened together by a solder joint, said sections being normally under spring tension tending to separate them at such joint.

6. In combination with a pipe, a self-closing damper therein, an operating rod for the damper, coöperative stop-plates on the pipe and rod respectively to limit the turning movement of the damper, a friction plate spring pressed against the stop plate on the rod, and a sectional detent having its sections joined by solder and attached respectively to the friction plate and to the stop plate on the pipe.

In witness whereof I have hereunto set my hand this sixth day of June 1914.

DAVID S. WATSON.

Witnesses:
 CARRIE E. WATSON,
 HENRY BELL.